US011279459B2

(12) United States Patent
Rahnama

(10) Patent No.: US 11,279,459 B2
(45) Date of Patent: Mar. 22, 2022

(54) HOVER ATTACHMENT FOR MOBILE DEVICE

(71) Applicant: Hossein Rahnama, Toronto (CA)

(72) Inventor: Hossein Rahnama, Toronto (CA)

(*) Notice: Subject to any disclaimer, the term of this patent is extended or adjusted under 35 U.S.C. 154(b) by 376 days.

(21) Appl. No.: 15/774,246

(22) PCT Filed: Mar. 24, 2016

(86) PCT No.: PCT/CA2016/050352
§ 371 (c)(1),
(2) Date: May 7, 2018

(87) PCT Pub. No.: WO2017/075695
PCT Pub. Date: May 11, 2017

(65) Prior Publication Data
US 2018/0327070 A1 Nov. 15, 2018

Related U.S. Application Data

(60) Provisional application No. 62/251,625, filed on Nov. 5, 2015.

(51) Int. Cl.
*B64B 1/40* (2006.01)
*B64C 39/02* (2006.01)
(Continued)

(52) U.S. Cl.
CPC .............. *B64B 1/40* (2013.01); *B64C 39/024* (2013.01); *G05D 1/0094* (2013.01); *G06F 3/147* (2013.01);
(Continued)

(58) Field of Classification Search
CPC ...... B64B 1/40; B64C 39/024; G05D 1/0094; H04B 1/3888; H04M 1/72527
(Continued)

(56) References Cited

U.S. PATENT DOCUMENTS 8,903,568 B1   12/2014  Wang et al.
8,908,573 B1 * 12/2014  Wang .................... H04L 1/0003
370/280

(Continued)

FOREIGN PATENT DOCUMENTS

JP        2009023379     2/2009
WO   WO 2014/106814   7/2015

OTHER PUBLICATIONS

PCT Search Report and Written Opinion dated Jul. 7, 2016.

*Primary Examiner* — Peter D Nolan
*Assistant Examiner* — Wae L Louie
(74) *Attorney, Agent, or Firm* — Dickinson Wright LLP; Yuri Chumak

(57) ABSTRACT

According to embodiments described in the specification, a hover attachment includes a housing operable to receive a mobile device having a processor, a memory, and a display, at least one sensor operable to detect a position parameter of the mobile device relative to an object under tracking, and a regulator operable to maintain, responsive to the detecting, the mobile device in a hover relation to the object under tracking, wherein the display of the mobile device is a situational display. An exemplary method includes providing a situational display interface on a display of a mobile device mounted in a hover attachment, detecting a movement of an object under tracking in hover relation to the mobile device, and when the detected movement is associated with a position change function, controlling the hover attachment to maintain the hover relation between the mobile device and the object under tracking.

12 Claims, 6 Drawing Sheets

(51) Int. Cl.
  *G06F 3/147* (2006.01)
  *H04M 1/72409* (2021.01)
  *G05D 1/00* (2006.01)
  *H04B 1/3888* (2015.01)

(52) U.S. Cl.
  CPC ...... *H04B 1/3888* (2013.01); *H04M 1/72409* (2021.01); *B64C 2201/022* (2013.01); *B64C 2201/027* (2013.01); *B64C 2201/101* (2013.01); *B64C 2201/108* (2013.01); *B64C 2201/123* (2013.01); *B64C 2201/127* (2013.01); *B64C 2201/141* (2013.01)

(58) Field of Classification Search
  USPC .............................................................. 701/4
  See application file for complete search history.

(56) References Cited

U.S. PATENT DOCUMENTS

| | | | | |
|---|---|---|---|---|
| 9,030,149 | B1* | 5/2015 | Chen | F16M 11/04 318/649 |
| 9,056,676 | B1* | 6/2015 | Wang | G01C 21/3697 |
| 9,139,310 | B1* | 9/2015 | Wang | B64C 39/02 |
| 10,520,943 | B2* | 12/2019 | Martirosyan | G05D 1/106 |
| 2010/0250022 | A1* | 9/2010 | Hines | G05D 1/0094 701/2 |
| 2010/0256948 | A1* | 10/2010 | Wright | G06Q 10/087 702/150 |
| 2011/0130636 | A1* | 6/2011 | Daniel | G08B 21/02 600/301 |
| 2015/0158392 | A1* | 6/2015 | Zhao | B64C 39/024 320/109 |
| 2015/0230150 | A1* | 8/2015 | Wang | H04B 7/18502 370/252 |
| 2015/0037025 | A1 | 12/2015 | Bachrach et al. | |
| 2016/0127641 | A1* | 5/2016 | Gove | G06T 1/0007 348/143 |
| 2016/0173742 | A1* | 6/2016 | Hassan Zureikat | B64C 39/024 348/144 |
| 2016/0292886 | A1* | 10/2016 | Erad | G06T 7/292 |
| 2018/0327070 | A1* | 11/2018 | Rahnama | H04B 1/3888 |
| 2019/0014760 | A1* | 1/2019 | Twining | A01M 31/002 |
| 2019/0051169 | A1* | 2/2019 | Gomez Gutierrez | G08G 1/0955 |
| 2019/0075252 | A1* | 3/2019 | Zhao | H04N 13/161 |
| 2019/0137597 | A1* | 5/2019 | Glover | G01S 3/02 |
| 2019/0179344 | A1* | 6/2019 | Qu | G01M 1/12 |
| 2019/0265705 | A1* | 8/2019 | Zhang | B64C 39/024 |
| 2019/0377345 | A1* | 12/2019 | Bachrach | G06T 7/20 |
| 2019/0393951 | A1* | 12/2019 | Hardy | H04N 7/181 |

* cited by examiner

HOVER ATTACHMENT FOR MOBILE DEVICE

FIELD OF TECHNOLOGY

The present disclosure relates to mobile devices. Certain embodiments provide a hover attachment or peripheral mount for a mobile device including a situational display, as well as methods for controlling the attachment, device and display.

BACKGROUND

A typical mobile device includes a touch-sensitive display and is hand held. Using a mobile device when looking down and walking, driving, or otherwise during movement can be distracting and potentially dangerous. When the user's focus and one or both of the user's hands are engaged in other tasks, it can be difficult to use a mobile device and pay attention to the surrounding environment and to loved ones, colleagues, and others.

Heads up displays (e.g. optical head mounted displays) and wearable devices have been developed in part to address this problem, but traditional approaches are unsatisfactory for several reasons, including that they can be heavy, intrusive, socially unacceptable, or uncomfortable (e.g., as by requiring a headset or other equipment to be worn).

Moreover, smart watches and smart bands can be less obtrusive but often provide reduced or otherwise compromised user interfaces, given their size and physical limitations.

Wearables containing radios or other electronics can emit radiation or become hot to the touch, posing discomfort or even a risk to health and safety when worn close to the brain or other vital organs or when in contact with the body.

Stationary displays can be adapted to augment the display of mobile devices (e.g. a display screen for video-conferencing, or an in-car display screen) but these are often restricted to a fixed location such as a meeting room.

Many barriers to engagement with mobile devices in diverse environments and contexts remain. Improvements in mobile devices with touch-sensitive displays, as well as peripherals for use with mobile devices, are desirable.

A need exists for an improved method of providing a user interface on a mobile device.

The foregoing examples of the related art and limitations related thereto are intended to be illustrative and not exclusive. Other limitations of the related art will become apparent to those of skill in the art upon a reading of the specification and a review of the drawings.

BRIEF DESCRIPTION OF THE DRAWINGS

Examples are illustrated with reference to the attached drawings. It is intended that the examples and figures disclosed herein be considered illustrative rather than restrictive.

DETAILED DESCRIPTION

The following describes a hover attachment that includes a housing operable to receive a mobile device having a processor, a memory, and a display, at least one sensor operable to detect a position parameter of the mobile device relative to an object under tracking, and a regulator operable to maintain, responsive to the detecting, the mobile device in a hover relation to the object under tracking, wherein the display of the mobile device is a situational display. The following also describes a method that includes the steps of providing a situational display interface on a display of a mobile device mounted in a hover attachment, detecting a movement of an object under tracking in hover relation to the mobile device, and when the detected movement is associated with a position change function, controlling the hover attachment to maintain the hover relation between the mobile device and the object under tracking.

Throughout the following description, specific details are set forth in order to provide a more thorough understanding to persons skilled in the art. However, well-known elements may not be shown or described in detail to avoid unnecessarily obscuring of the disclosure. Accordingly, the description and drawings are to be regarded in an illustrative, rather than a restrictive, sense.

This disclosure relates generally to mobile devices, situational displays and particularly to a hover attachment for a mobile device providing a situational display.

Use of hand-held devices such as phones, tablets, certain wearables and the like, can be a distraction when interacting in the real world. For example, a user carrying a phone might look down to use touch-sensitive display, hitting different obstacles leading to a fall or other injury. Mobile devices can absorb the user's entire attention, making it difficult for users to "be present" in the real world. It is desirable to provide a mobile device that permits the user to not only pay attention to and maintain vision with persons, objects and potential hazards but also to interact with the mobile device or auxiliary display without distracting the user from the real world.

Figure 1:
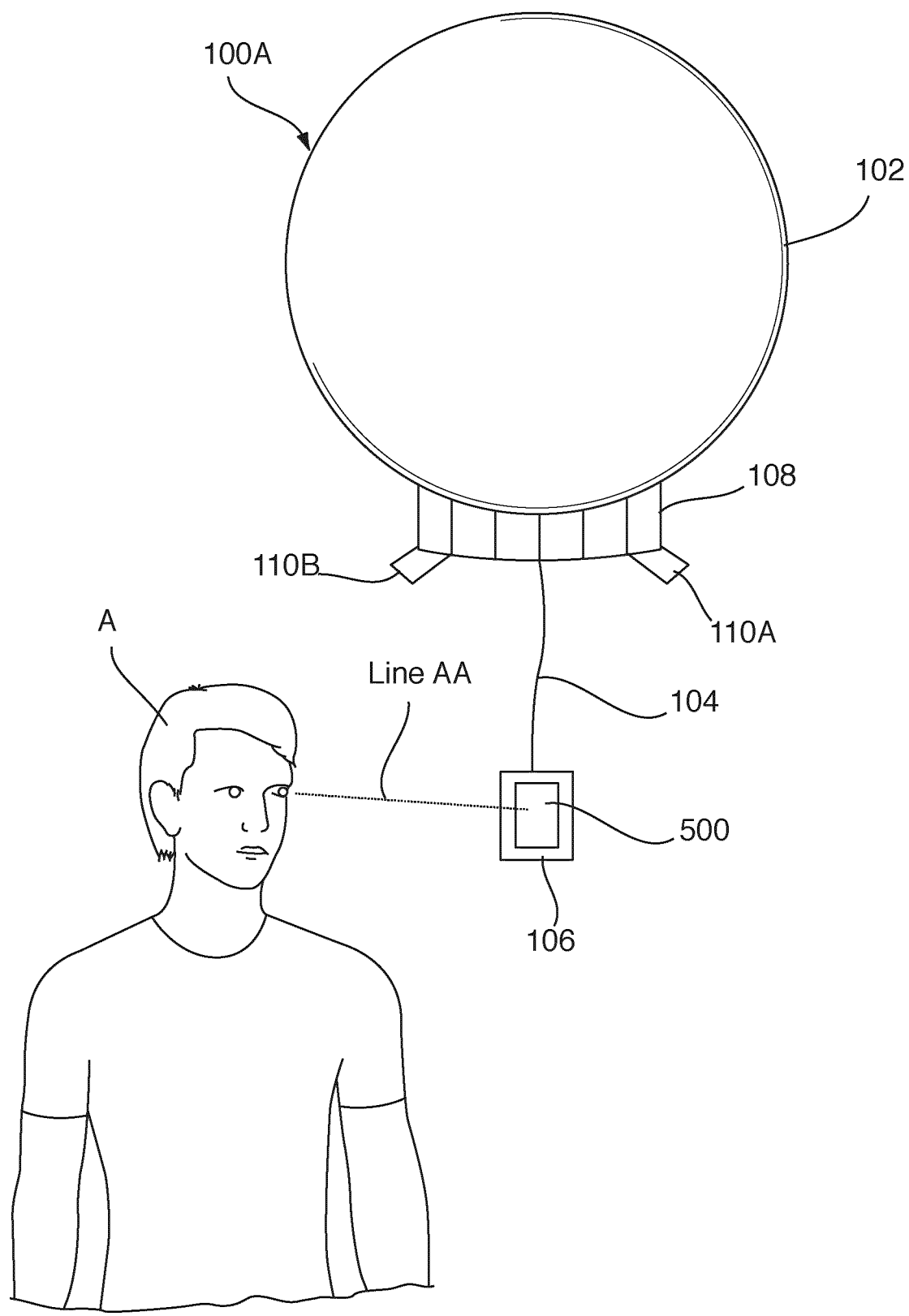
FIG. 1 is a perspective view of a hover attachment in accordance with an example.

FIG. 1 illustrates a hover attachment 100A for use with a mobile device 500 according to a first example. The hover attachment 100A can be an aerial device that includes an aerial balloon 102. A cable 104, attached to a housing 106, can be suspended from a skirt 108 of the aerial balloon 102. The housing 106 provides a slot for securing the mobile device 500 to the hover attachment 100A. In an alternative example, the cable 104 can be omitted and the housing 106 can be integral with the skirt 108 or the aerial balloon 102. One or more thrusters 110 (e.g. thrusters 110A and 110B are illustrated in FIG. 1) enable the hover attachment 100 to change position or location. The hover attachment 100A can change location to maintain a spaced apart distance from an object under tracking, shown by Line AA in FIG. 1.

Figure 2:
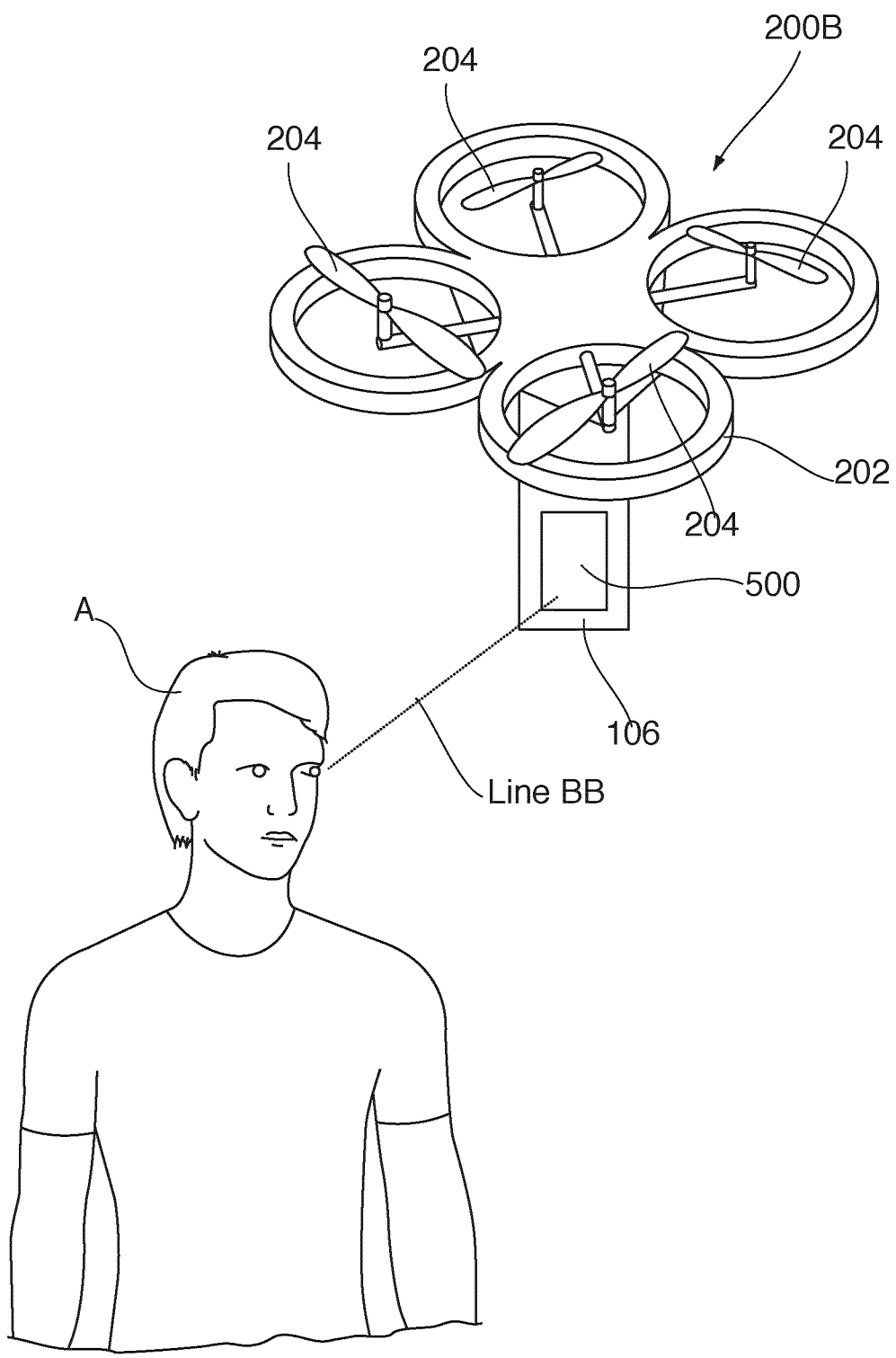
FIG. 2 is a perspective view of a hover attachment in accordance with an alternative example.

FIG. 2 illustrates a hover attachment 100B for use with a mobile device 500 according to a second example. The hover attachment 100B can be an aerial device that includes a drone 202 having one or more propellers 204 (four propellers 204 are pictured in FIG. 2). A drone is an unmanned aerial vehicle that is controlled autonomously by onboard computers. The hover attachment 100B can change location to maintain a spaced apart distance from an object under tracking, shown by Line BB in FIG. 2.

Figure 3:
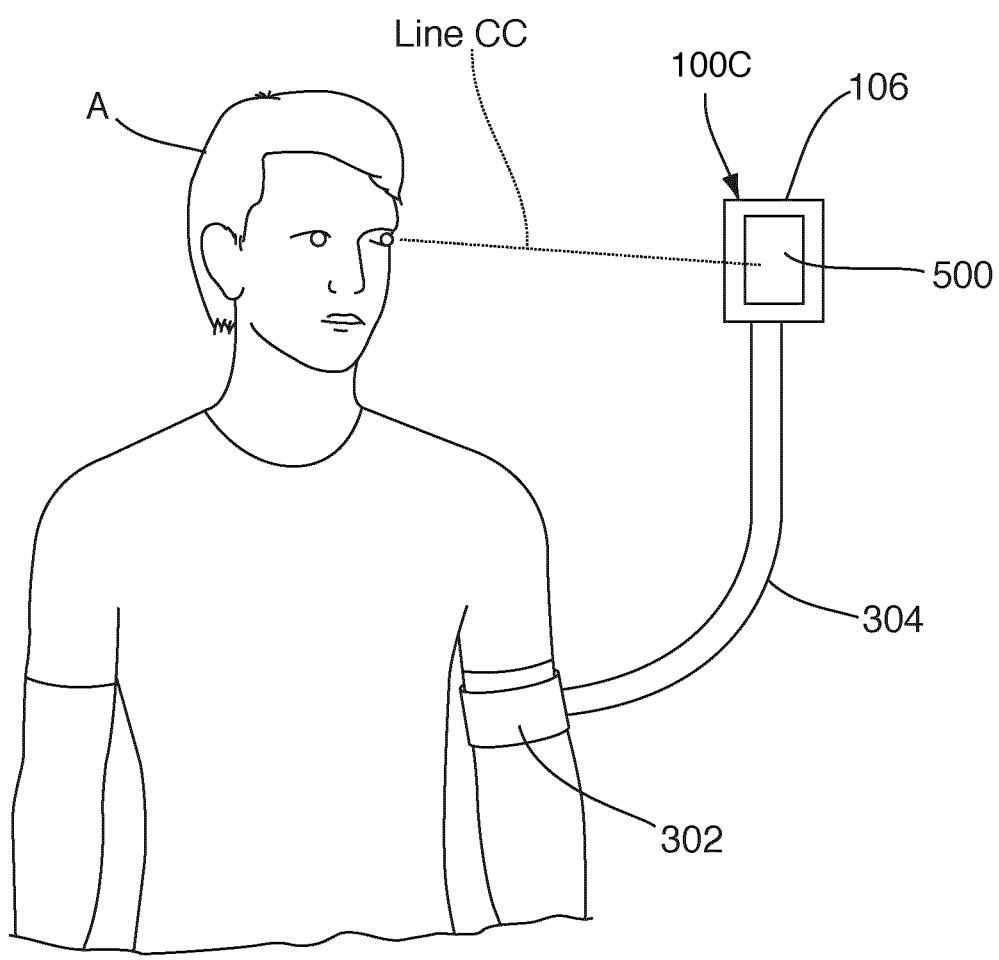
FIG. 3 is a perspective view of a hover attachment in accordance with a further alternative example.

FIG. 3 illustrates a hover attachment 100C for use with a mobile device 500 according to a third example. The hover attachment 100C includes an elongated arm 304 extending from a wearable portion of the attachment (such as arm band 302 pictured in FIG. 3). It will be appreciated that the hover attachment 100C maintains a spaced apart relation from the user. The elongated arm 304 can be flexible and a portion can bend, travel or rotate to maintain the spaced apart relation leveraging the power supply of the mobile device 500 and using mechatronic techniques known to those of skill in the art. The wearable portion of the hover attachment 100C can attach to any part of the user's body such as the user's arm or hand. The location of the hover attachment 100C can be changed to maintain a spaced apart distance from an object under tracking, such as the user's gaze, shown by Line CC in FIG. 3.

Figure 4:
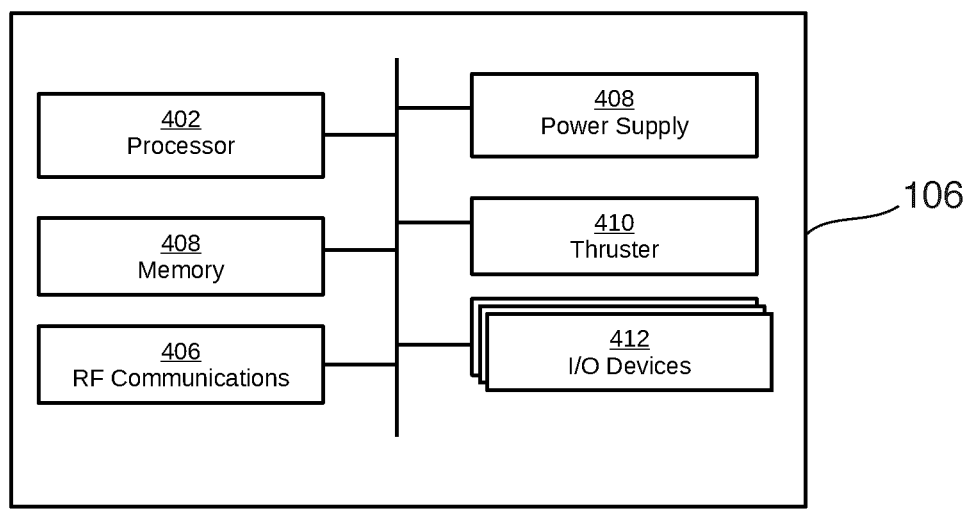
FIG. 4 is a box diagram of the hover attachment of FIG. 1.

FIG. 4 is an exemplary box diagram of a housing 106 for use with an example of the hover attachment 100. The housing 106 can be contained within the skirt 108, for example, as shown in FIG. 1. According to one example, the housing 106 includes multiple components, such as a processor 402 that controls the overall operation of the hover attachment 100. A power supply 408, such as one or more rechargeable batteries or a port to an external power supply (e.g. a power supply mounted to the hover attachment), powers the housing 106 or other components of the hover attachment. The processor 402 interacts with other components, such as a memory 404 (e.g. Random Access Memory (RAM) or data storage), a communications subsystem 406, a thrust control system 410 operable to control thrusters 110, a speaker 412, a microphone 414, one or more cameras 416, a data port 418, and one or more I/O devices 420. Optionally, the housing 116 can include one or more displays. The communication subsystem 406 can be a RF communication subsystem. Alternatively, the communication subsystem can receive messages from and send messages to a wireless network 450 (discussed in more detail below). The data port 418 can be a male data port marketed under the names USB or Lightning that is compatible with the data port of the mobile device 500 permitting charging and synching functions. Generally speaking, any type of connector, wired or wireless, can be used to connect the mobile device 500 to the housing 106. In one example, the power supply 408 can be a solar panel. In a further example, the power supply 408 includes a battery that carries power to not only the electronics and controls of the hover attachment 100 but also to the mobile device 500. Alternatively, the power supply of the mobile device 500 (discussed below) can also carry power to the hover attachment 100.

Figure 5:
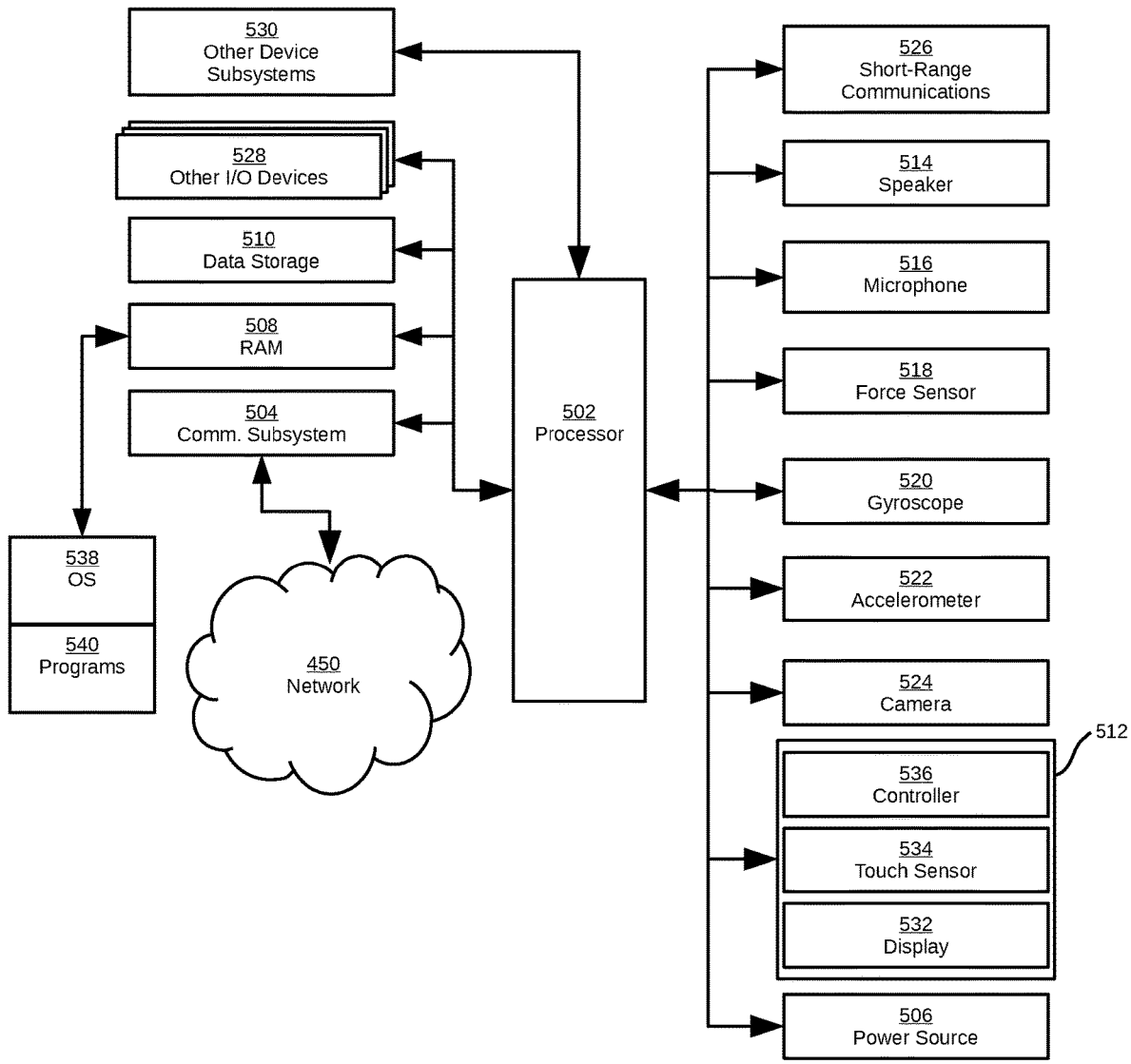
FIG. 5 is a block diagram of a mobile device in accordance with an example.

A block diagram of an example of a mobile device 500, also referred to as an electronic device or a device, is shown in FIG. 5. The mobile device 500 includes multiple components, such as a processor 502 that controls the overall operation of the mobile device 500. Communication functions, including data and voice communications, are performed through a communication subsystem 504. The communication subsystem 504 receives messages from and sends messages to a wireless network 450. The wireless network 450 can be any type of wireless network, including, but not limited to, data wireless networks, voice wireless networks, and networks that support both voice and data communications. A power source 506, such as one or more rechargeable batteries or a port to an external power supply, powers the mobile device 500.

The processor 502 interacts with other components, such as a Random Access Memory (RAM) 508, data storage 510 (which can be cloud storage), a touch-sensitive display 512, a speaker 514, a microphone 516, one or more force sensors 518, one or more gyroscopes 520, one or more accelerometers 522, one or more cameras 524 (such as front facing camera 524a and back facing camera 524b), short-range communications subsystem 526, other I/O devices 528 and other subsystems 530. The touch-sensitive display 512 includes a display 532 and touch sensors 534 that are coupled to at least one controller 536 utilized to interact with the processor 502. Input via a graphical user interface is provided via the touch-sensitive display 512. Information, such as text, characters, symbols, images, icons, and other items that may be displayed or rendered on a mobile device, is displayed on the touch-sensitive display 512 via the processor 502.

The mobile device 500 includes an operating system 538 and software programs, applications, or components 540 that are executed by the processor 502 and are typically stored in a persistent, updatable store such as the data storage 510. Additional applications or programs may be loaded onto the mobile device 500 through the wireless network 450, the short-range communications subsystem 526, or any other I/O devices 528 or subsystem 530.

The processor 502 can also interact with one or more sensors to sense, or detect, a position parameter. The position parameter can be one or more data field associated with a user's eye tracking position, a head tracking position, and a gaze tracking position. One or more sensors of the mobile device 500 or housing 106 can be used. For example, an accelerometer 522 can be utilized to detect direction of gravitational forces or gravity-induced reaction forces to determine movement of the mobile device 500. More generally, one or more sensors detect the movements and changes of position and orientation of the mobile device 500 or user relative to the hover attachment 100. According to one example, the position parameter includes a detected head position, a detected gaze position, and a detected distance of the hover attachment 100 to a user. Communication between the hover attachment 100 and the mobile device 500 can occur through one or more channels including short wave radio, BlueTooth, wireless, or by wired connection.

In operation, the touch-sensitive display 512 of the mobile device 500 that is mounted in the housing 106 of the hover attachment 100 hovers or floats, responsive to the user's movements, permitting the user to be engaged in other tasks in the the real world. Advantageously, the hover attachment 100 (and the secured mobile device 500) moves in accordance with sensed position parameters. As explained elsewhere in the description, the position parameter can include the user's gaze (e.g. where the user is looking), the user's head position, brightness, battery power, among others.

Relative to heads up display or other headmounted gears, examples of the hover attachment 100 disclosed in the present specification keep the mobile device 500 and its electronics at a distance apart from the user and with less weight to carry.

Moreover, exemplary software applications loaded on the mobile device 500 can display content and media that is tailored to the environment determined by GPS, beacon or other sensed or contextual parameters. For example, turn-by-turn directions or augmented reality information can be displayed, providing enhanced information about the user's location or real world sites of interest.

Figure 6:
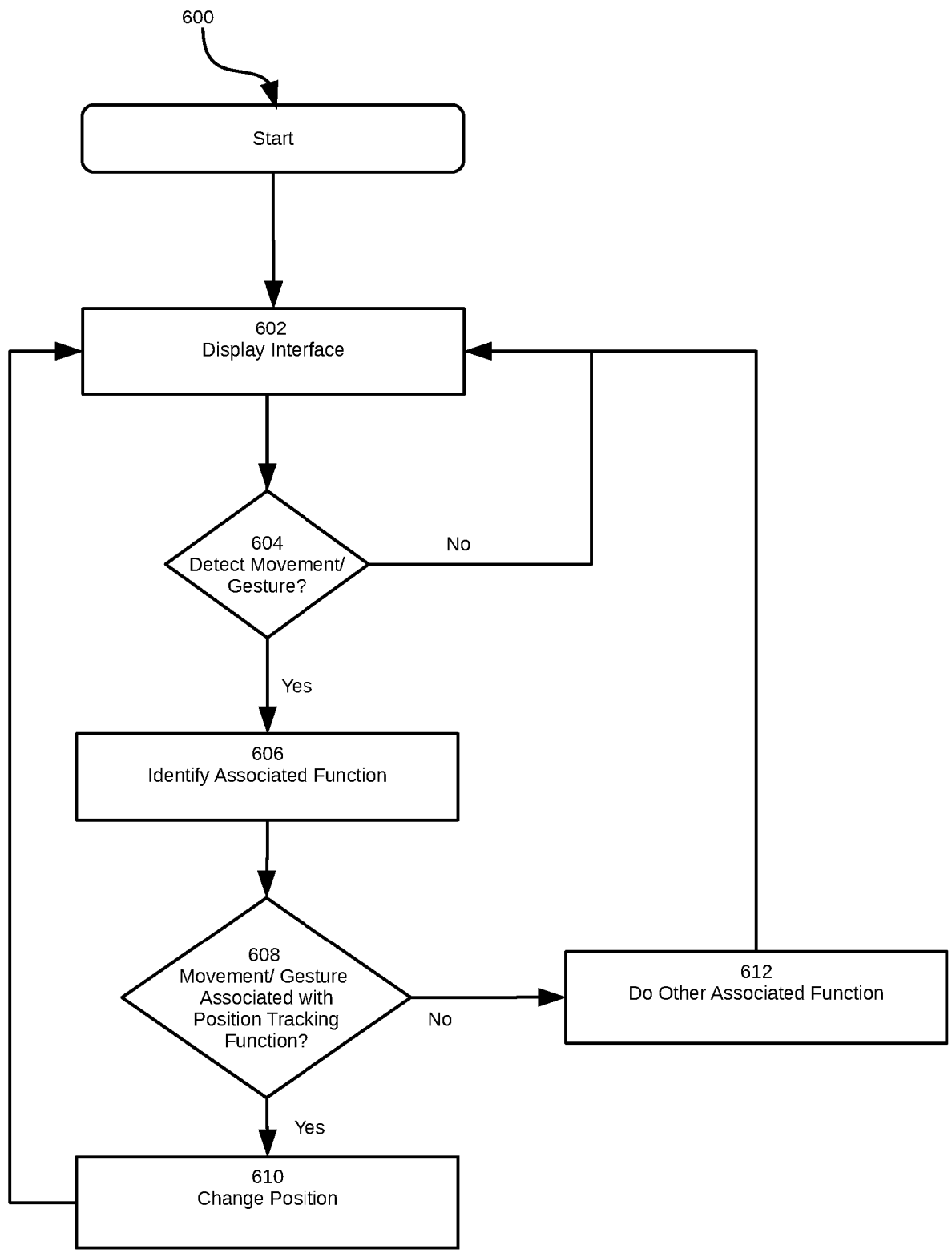
FIG. 6 is a flowchart illustrating an example of a method of changing a hover attachment position.

A flowchart illustrating an example of a method of changing a hover relation of a hover attachment, such as the hover attachment 100, is shown in FIG. 6. The method can be carried out by software executed by, for example, processor 402 or processor 502. Coding of software for carrying out such a method is within the scope of a person of ordinary skill in the art given the present description. The method can contain additional or fewer processes than shown and/or described, and can be performed in a different order. Computer-readable code executable by at least one processor of the hover attachment to perform the method can be stored in a computer-readable storage medium, such as a non-transitory computer-readable medium.

When a user movement or gesture is detected on the hover attachment 100 (or mobile device 500) at 602, the attributes of the user movement or gesture are determined. The attributes of the movement or gesture can include one or more position parameters. As described above with reference to FIG. 4 and to FIG. 5, use of the term "position parameter" can refer to any change of position or orientation of the mobile device 50 or user relative to the hover attachment 100.

The gesture or movement can be associated with a function and the function is identified at 606 of FIG. 6. The function associated with the movement or gesture is dependent on the attributes of the movement or gesture. For example, a movement or gesture can be associated with a position tracking function to change the position (e.g. location) of the hover attachment 100 by triggering a command to control thrusters 110, for example. Alternatively, a movement or gesture can be associated with a function to interact with an app or routine loaded on the mobile device. Slight movements or gestures, meaning movements or gestures that do not meet a predetermined threshold, such as a predetermined degree, may not be associated with any functions. Slight movements can occur during use of the mobile device 500 mounted in the hover attachment 100 and may not be associated with a position tracking function to reduce the chance of performing an undesirable position tracking function, for example, while interacting with the user interface of an app (application 540) or otherwise to avoid ambiguous or constant movement of the hover attachment 100.

When the movement or gesture is associated with a position tracking function at 608, the process continues at 610. The position tracking function is a function to change the position of the hover attachment by use of thrusters 110 (of the hover attachment 100A, for example). For example, the position tracking function can increase or decrease the distance of the hover attachment 100 relative to the user, in response to the movement or gesture and based on the movement or gesture attributes. Alternatively, the position tracking function can alter or change the height or flotation of the hover attachment 100 relative to the user.

Use of the term movement or gesture extends to any trigger or command by the object under tracking (e.g. user, user's head, user's eyes), and can extend to spoken commands or gestures. For example, speaking aloud the command "closer" can be associated with a position tracking function such that the distance between the user and the hover attachment 100 is reduced.

Other position tracking functions can be utilized. For example, a navigation interface can be displayed in response to a movement or gesture in one direction while an augmented reality interface can be displayed in response to a movement or gesture in another direction.

The change of the hover position can be changed at a rate or speed dependent on the movement or gesture detected at 604. Thus, a slow gesture or movement can be ignored while a faster gesture or movement can move the hover attachment to a new position or location.

When the movement or gesture is not associated with a position tracking function at 608, the process continues at 612 and a function associated with the movement or gesture is performed. For example, the position tracking function can be carried out or performed in response to movements of the user greater than a pre-determined threshold, such as a distance of 30 cm or any other suitable distance. A position tracking function can not respond to, for example, movements under this threshold. Thus, a function associated with the movement or gesture at 612 can be a function other than a position tracking function such as, for example a function to scroll displayed information, a function to open or close an app, or any other suitable function that can be associated with a movement or gesture.

Examples of the hover attachment, mobile device, and situational display, and methods of controlling same, can extend to fields of use including video-conferencing, street view displays, turn-by-turn navigation or any other field that in which an augmented display provides benefit.

According to alternative examples, the hover attachment according to the present specification can be adapted for use indoors or outdoors. For example, rather than relying on GPS data for outdoor use, beacon sensor data for indoor use can be used.

The skilled reader will appreciate that sensor data from one or more sensors can be leveraged without departing from the scope of the present specification. Use of the term sensor in this specification extends to any device capable of sensing, or detecting, a characteristic of the environment, user, mobile device or peripheral including but not limited to light, sound, temperature, pressure, humidity, motion, position, orientation, acceleration, and displacement.

The present specification provides a hover attachment that includes a housing for receiving a mobile device having a processor, a memory, and a display, at least one sensor for detecting a position parameter of the mobile device relative to an object under tracking, and a regulator for maintaining, responsive to the detecting, the mobile device in a hover relation to the object under tracking, wherein the display of the mobile device is a situational display.

The housing can include an aerial device and the object under tracking can be a user.

The aerial device can be an unmanned aerial vehicle selected from one of: an aerial balloon and a drone.

In one example, the aerial device can be an aerial balloon and one or more thrusters, and the regulator can be a thruster control system.

In an alternative example, the housing can include a wearable, flexible and elongated peripheral, the object under tracking can be a head of a user, and the hover relation can be a spaced apart relation of the head and the peripheral.

The hover attachment of claim 1 further comprising a controller and short range communications means for communicating with a subsystem of the mobile device.

The at least one sensor can be a plurality of sensors selected from: one or more gyroscopes, one or more accelerometers, and one or more cameras. The mobile device can include a plurality of device sensors and the at least one sensor can be augmented by the plurality of device sensors.

The position parameter can be one or more of an eye tracking position parameter, a head tracking position parameter, and a gaze tracking position parameter.

The housing can be integral with the mobile device.

The present specification also provides a method that includes the steps of providing a situational display interface on a display of a mobile device mounted in a hover attachment, detecting a movement of an object under tracking in hover relation to the mobile device, and when the detected movement is associated with a position change function, controlling the hover attachment to maintain the hover relation between the mobile device and the object under tracking.

The present specification further provides a mobile device mounted in a hover attachment including a display, at least one processor coupled to the display and operable to, provide a situational display interface on the display, detect a movement of an object under tracking in hover relation to the mobile device, and when the detected movement is associated with a position change function, control the hover attachment to maintain the hover relation between the mobile device and the object under tracking.

While a number of exemplary aspects and examples have been discussed above, those of skill in the art will recognize certain modifications, permutations, additions and sub-combinations thereof.

The invention claimed is:

1. A hover attachment comprises: a housing operable to attach to a mobile device having a processor, a memory, and a display; at least one sensor operable to detect a position parameter of the mobile device relative to an object under tracking, the object comprising a head of a user; and a regulator operable to maintain, responsive to the detecting, the attached mobile device in a hover relation to the object under tracking, wherein the display of the attached mobile device housed in the hover attachment is a situational display positioned at a hovering distance from the head of the user displaying a user interface at the hovering distance and enabling the user's hands-free and distraction-less interaction with the display.

2. The hover attachment of claim 1 wherein the housing comprises an aerial device.

3. The hover attachment of claim 2 wherein the aerial device comprises an unmanned aerial vehicle selected from one of: an aerial balloon and a drone.

4. The hover attachment of claim 2 wherein the aerial device comprises an aerial balloon and one or more thrusters, and the regulator comprises a thruster control system.

5. The hover attachment of claim 1 wherein the housing comprises a wearable, flexible and elongated peripheral, the object under tracking is a head of a user, and the hover relation comprises a spaced apart relation of the head and the peripheral.

6. The hover attachment of claim 1 further comprising a controller and short range communications means operable to communicate with a subsystem of the mobile device.

7. The hover attachment of claim 1 wherein the at least one sensor comprises a plurality of sensors selected from: one or more gyroscopes, one or more accelerometers, and one or more cameras.

8. The hover attachment of claim 7 wherein the mobile device comprises a plurality of device sensors and the at least one sensor is augmented by the plurality of device sensors.

9. The hover attachment of claim 7 wherein the position parameter comprises one or more of an eye tracking position parameter, a head tracking position parameter, and a gaze tracking position parameter.

10. The hover attachment of claim 1 wherein the housing is integral with the mobile device.

11. A method comprising: providing a situational display interface on a display of a mobile device attached to and mounted in a hover attachment, the situational display interface positioned at a hovering distance from an object under tracking comprising a head of a user; detecting a movement of the object under tracking in hover relation to the mobile device mounted in the hover attachment; and when the detected movement is associated with a position change function, controlling the hover attachment to maintain the hover relation between the situational display of the mobile device and the object under tracking.

12. A mobile device attached to and mounted in a hover attachment comprising: a display; at least one processor coupled to the display and operable to: provide a situational display interface on the display; detect a movement of an object under tracking comprising a location of a head of a user in hover relation to the display of the mobile device positioned at a hovering distance from the head of the user; and when the detected movement is associated with a position change function, control the hover attachment to maintain the hover relation between the display of the mobile device and the object under tracking, wherein hover relation enables the user's hands-free and distraction-less interaction with the situation display interface.

* * * * *